Jan. 16, 1968 A. C. BRADHAM III 3,364,300

MODULAR CIRCUIT BOARDS

Filed March 19, 1965 3 Sheets-Sheet 1

Jan. 16, 1968 A. C. BRADHAM III 3,364,300

MODULAR CIRCUIT BOARDS

Filed March 19, 1965 3 Sheets-Sheet 3

Allen C. Bradham III,
Inventor,
Koenig, Senniger, Powers and Leavitt,
Attorneys.

United States Patent Office 3,364,300

Patented Jan. 16, 1968

3,364,300

MODULAR CIRCUIT BOARDS

Allen C. Bradham III, Houston, Tex., assignor to Texas Instruments Incorporated, Dallas, Tex., a corporation of Delaware Filed Mar. 19, 1965, Ser. No. 441,042
8 Claims. (Cl. 174—68.5)

ABSTRACT OF THE DISCLOSURE

A modular circuit board assembly structure is disclosed which includes a pair of outer boards and one or more identical inner boards sandwiched between the outer boards. The inner boards are each comprised of a sheet of insulating material having an array of holes therethrough in registry with holes of an adjacent board and having a conductive grid connected to one side of said board to form a conductive grid pattern which covers the openings in the inner board. The outer boards are each made of an insulating sheet having rows of openings through the sheet infilled at least in part with conductive material to present contact means on one side of the sheet for the welding of electrical components, such as semiconductor networks. At least some of the rows of holes in the inner boards are in registry with the rows of openings through the insulating sheet of the outer boards. Interconnections between the boards are effected through the insertion of pins in the appropriate holes.

This invention relates to improved modular circuit boards and their assemblies, and, with regard to certain more specific features, to such boards and assemblies thereof for providing complex miniaturized electronic circuitry useful in small spaces.

Among the several objects of the invention may be noted the provision of improved modular circuit boards which eliminate the formerly costly fabrication of circuitry by etching; the provision of circuit board assemblies, the components of which may be constructed according to a minimum number of standardized patterns and which may conveniently be stocked for rapid use in production of assemblies containing various numbers of such components; the provision of stock boards of the class described which may be rapidly prepared to provide for any of various desired interconnections in and between various levels of desired circuits in the assemblies; and the provision of boards of the class described by means of which completely welded multilayer circuits may readily be obtained and the welds in which may be made and inspected at various levels during assembly. Other objects and features will be in part apparent and in part pointed out hereinafter.

The invention accordingly comprises the elements and combinations of elements, features of construction and manipulation, and arrangements of parts which will be exemplified in the constructions hereinafter described, and the scope of which will be indicated in the following claims.

In the accompanying drawings, in which several of various possible embodiments of the invention are illustrated:

FIG. 1 is a plan view of one of a pair of standardized boards to be used at the outsides of multiplanar board assemblies;

FIGS. 2 and 3 are detail sections taken on lines 2—2 and 3—3, respectively, of FIG. 1;

FIG. 4 is a plan view of another one of said pair of boards;

FIGS. 5 and 6 are detail sections taken on lines 5—5 and 6—6, respectively, of FIG. 4;

Corresponding reference characters indicate corresponding parts throughout the several views of the drawings.

Figure 1:
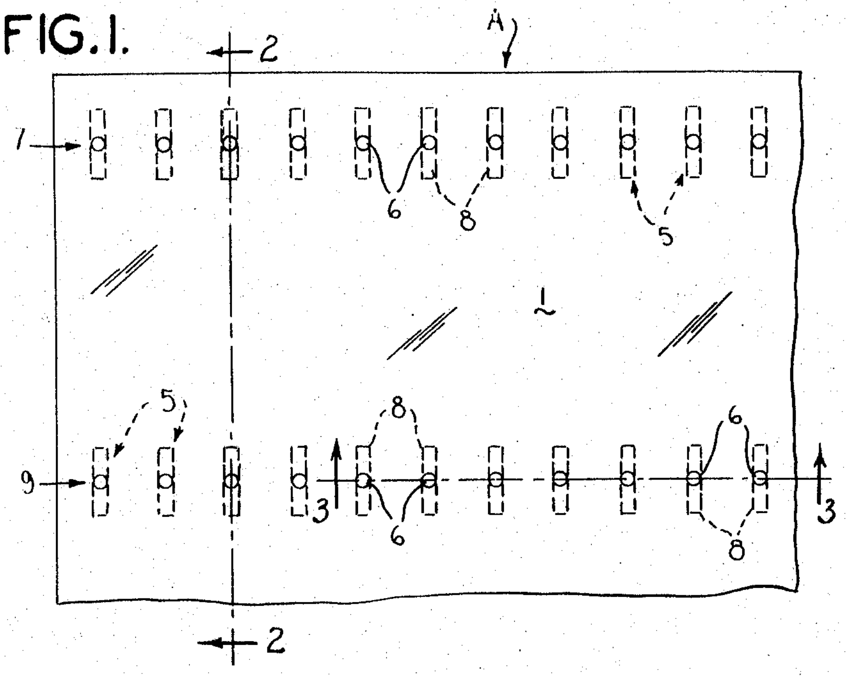

Hereinafter the term "insulating board" means a single-ply or multi-ply layer of a substantially tough and rigid insulating material forming a substrate such as, for example but without limitation, an epoxy-impregnated fibreglass sheet. Its thickness may be such as is known in the art, for example, 1/32 inch. The term "foil" means a single-ply or multi-ply conductive circuit-forming layer composed of one or more conductive materials such as, for example, Kovar, nickel or the like, being attached to a board by adhesion or cohesion. Its thickness may be, for example, 1/64 inch. Kovar is a trade mark for an alloy consisting of approximately 29% nickel, 17% cobalt, up to 0.2% manganese and the remainder iron. The term "modular circuit board" means the combination of an insulating board and conductive parts thereon in a condition prior to assembly with other modular boards. Only one corner is shown of each modular board referred to herein, it being understood that the areas of the boards may be made as extensive as desired and the arrays of parts thereon (to be described) multiplied to any extent desired.

The invention has particular application to miniaturized circuitry to accommodate dense circuit routings. The thicknesses of the boards and their foils, being small, are necessarily exaggerated in the drawings.

Figure 2:
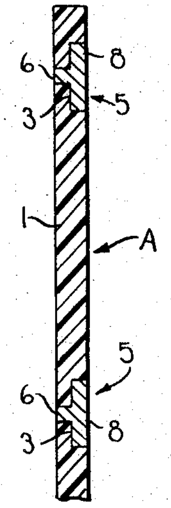
Figure 3:
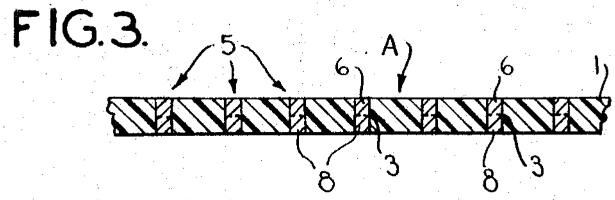
Figures 4, 5, 6, 10:
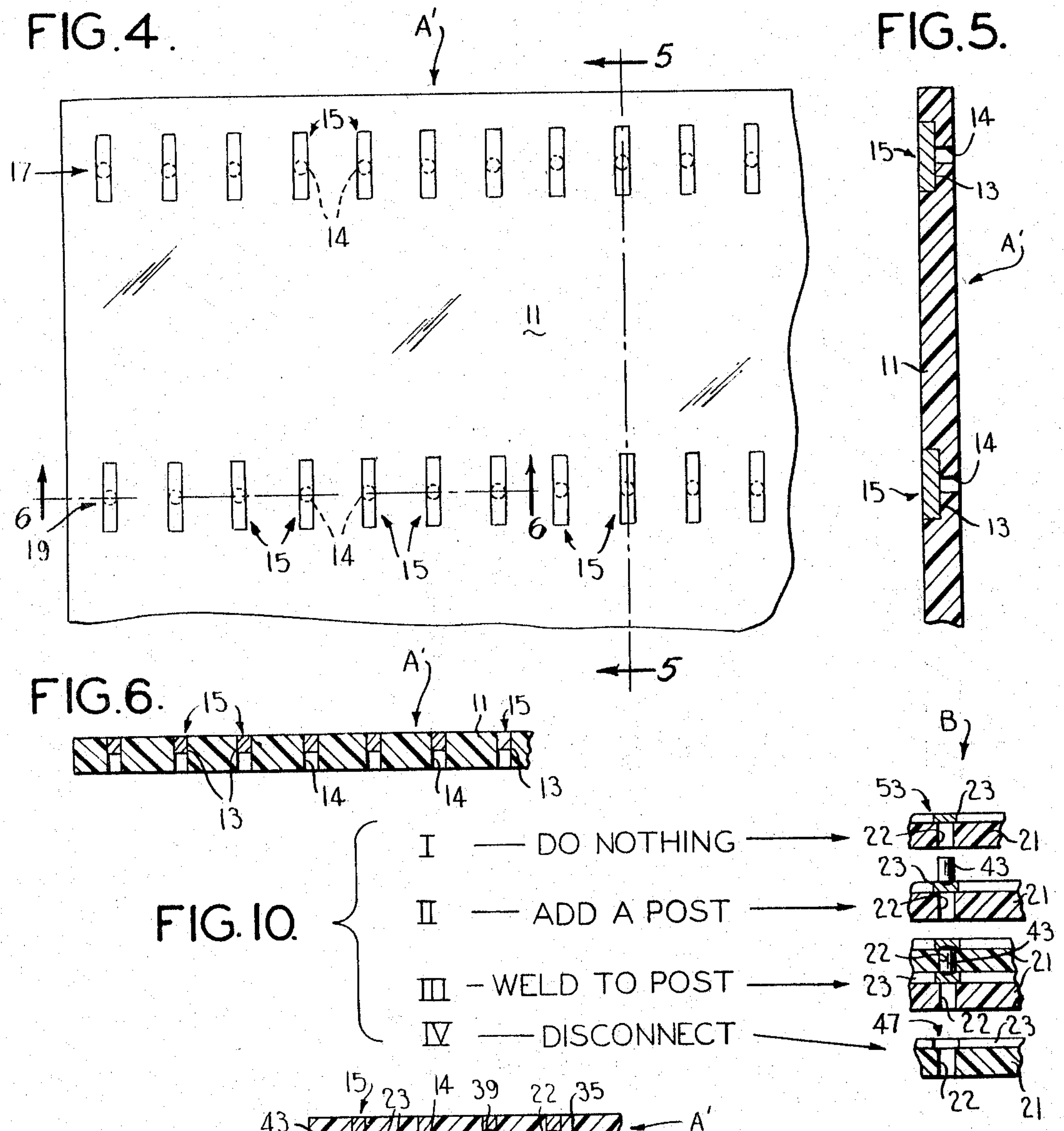
FIG. 10 is a composite view further illustrating said procedures.
Figure 11:
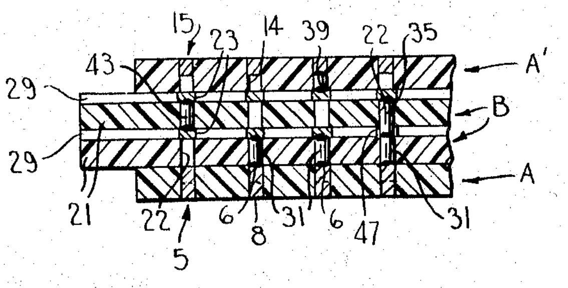
FIG. 11 is a fragmentary cross section of a multilayer circuit board assembly made according to the invention.

Referring now more particularly to FIGS. 1–3, there is shown one outside standardized board which will hereinafter be referred to as board A or an A board. FIGS. 4–6 show the other outside standardized board which will hereinafter be referred to as board A' or an A' board. These A and A' boards are quite similar in all but a few features to be described and are preferably rectangular and of the same size.

An A board (FIGS. 1–3) comprises a sheet of said insulating substrate material numbered 1 in which is an array of T-shaped openings 3, infilled with a suitable electrically conductive metal insert 5 such as Kovar, nickel or the like. Each T-shaped conductive insert 5 has a stem or post 6 and a crosshead 8. For a given application all A boards are identical for stocking in quantity. The array of inserts 5 comprises rows such as 7 and 9 for the application of any appropriate connections to, from or between them. For example, semiconductor networks may be connected across these in a manner to appear below.

An A' board (FIGS. 4–6), comprises a sheet of said insulating substrate material, in this case numbered 11 (like sheet 1 of the A board) in which is an array of T-shaped openings 13 (like the openings 3 in the A board). In this case, however, the T-shaped openings are only partially infilled with electrically conductive material. The stem portions are empty, forming holes 14. Only the crosshead portions of the T-shaped openings are infilled with conductive inserts 15. The holes 14 and the conductive partial infillings 15 are in an array comprising rows 17 and 19 (corresponding in position to the rows 7 and 9 in the case of the A board of FIGS. 1–3).

From the above it will be understood that the A and A' boards are substantially the same in form in regard to their rectangular sizes and shapes and in regard to the row formations 7, 9 and 17, 19 of the arrays of inserts. Thus the boards differ merely in the shapes of the inserts 5 (board A) and 15 (board A'). As will appear, the A and A' boards will form the outside layers of assemblies which include sandwiched boards B to be described (FIGS. 7 and 9–12). The boards B will hereinafter be referred to as B boards. The outside surfaces of the A, A' boards when assembled will exteriorly present the portions 8 of the conductive inserts 5 (board A) and inserts 15 (board A'). Thus in the case of the board A, the stems or posts 6 of the T-shaped inserts 5 will be presented inwardly and the cross portions outwardly. In the case of the board A' the empty parts of the holes 14 will be presented inwardly and the cross portions outwardly.

Figure 7:
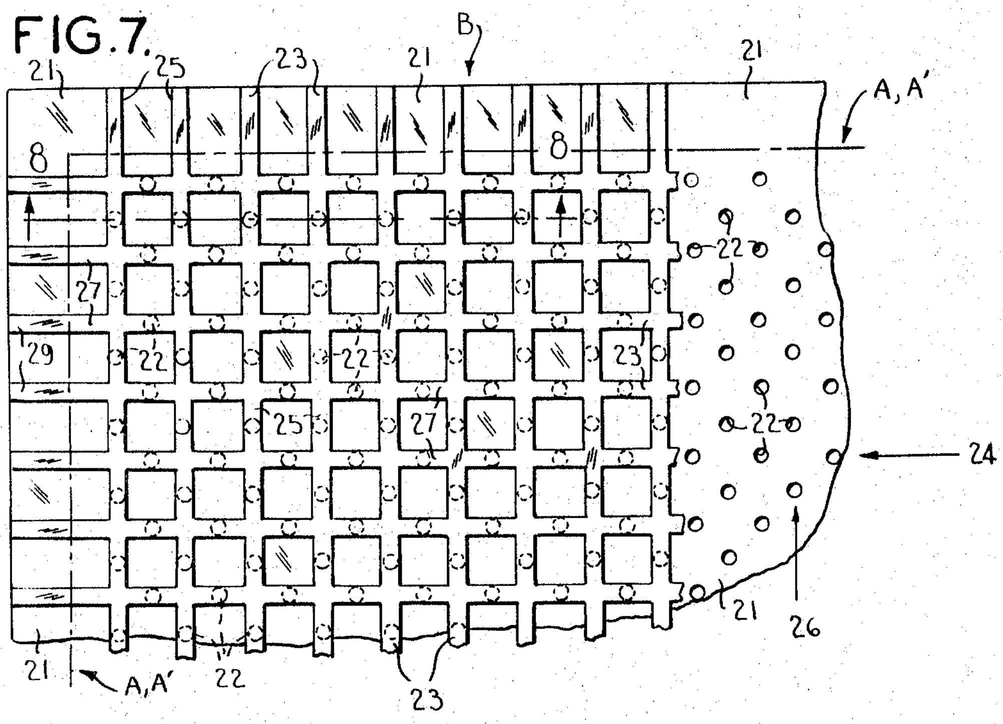
FIG. 7 is a broken plan view of another type of standardized board carrying improved foil in the form of a prepared grid, this type of board to be sandwiched between pairs of boards such as shown in FIGS. 1 and 4.
Figure 8:
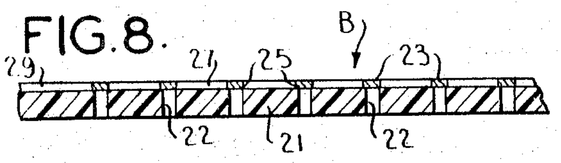
FIG. 8 is a detail section taken on line 8—8 of FIG. 7.

Referring to FIGS. 7 and 8, these show standardized B boards which are identical. Each is composed of an insulating substrate material such as above described and lettered 21. These boards may be of the same rectangular shape as the A' boards, or they may be somewhat larger. The larger form is shown in FIG. 7, the A, A' boards in this case being somewhat smaller. The dot-dash lines indicated at A, A' in FIG. 7 indicate what locations the A and A' outer boards will have in sandwiching assembly with one or more of the B boards therebetween (see also FIGS. 10 and 11). Each B board has an array of staggered holes 22 arranged in rows 24 and columns 26. Openings 14 in board A' and the stem parts 6 of board A are arranged for registry with holes 22 in certain rows 24 of the B boards.

Attached on one side of each B board substrate 21 (the upper side in FIG. 7), is a preformed foil or sheet 23. This is in the form of a square grid. Attachment is, for example, by an epoxy resin. Each grid sheet 23 may, for example, be 1/64 inch thick. It is prepared, prior to its adhesive attachment to the insulated sheet 21 of a B board, by punching, cutting or the like from a solid metal sheet. In this manner grids may be economically produced in quantity and stocked for attachment to substrates 21 to form B boards, as illustrated in FIG. 7. In this form, the B boards may be stocked for subsequent assembly of one or more of them between the A, A' boards.

As is apparent from FIG. 7, crossing strips 25 and 27 of the grid cover the columns 26 and rows 24 of the array of holes 22. It will be seen from FIG. 7 that the ends of the crossing strips 25 and 27 are extended as at 29 so as to present portions beyond the locations of A, A in assembly for making such outside electrical connections as may be desired (see also FIGS. 9 and 12).

Figure 13:
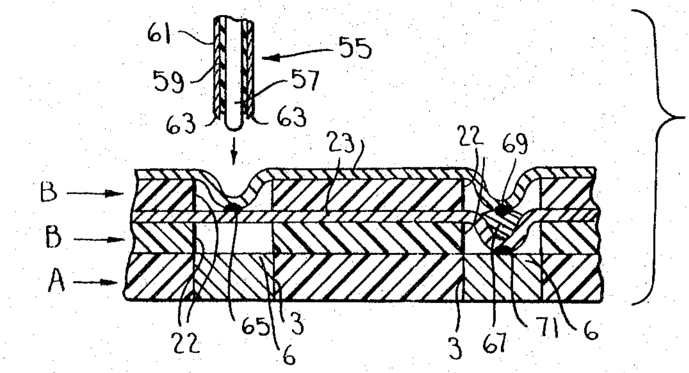
FIG. 13 is a fragmentary detail section illustrating an alternative method for making welded conductive connections between boards.

In FIGS. 10 and 13 are illustrated different operations that may be performed in respect to a grid 23 attached on a substrate 21 (herein called a B board). At level I in FIG. 10 is illustrated a sheet 21 of a B board with a strip portion of the grid 23 overlying a hole 22. This is uncut, as shown at 53. This shows that no operation is to be performed upon the strip portion 23 at the hole 22. At level II is shown a B board with an empty hole 22 traversed by a portion of the grid 23 and over which has been welded a conductive post 43. At level III in FIG. 10 another B board has been applied over the arrangement shown on level II so that a hole 22 has received the post 43 for contact with and weldment to the overlying strip of grid 23. In this case the post may carry current up or down. At level IV is shown a B board with an empty hole 22. In this case the overlying strip portion of the grid 23 has been cut away, as indicated at 47. This forms a disconnection in the grid 23.

Figure 9:
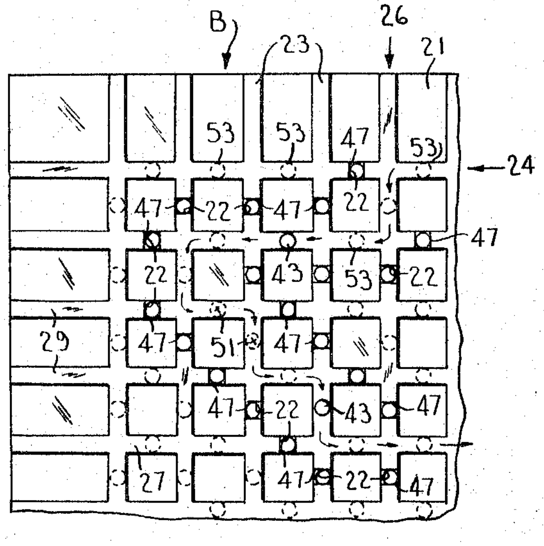
FIG. 9 is a fragmentary view similar to FIG. 7, illustrating certain procedures for preparing a board such as shown in FIG. 7 to produce desired circuitry when the board is used in an assembly.

In FIG. 9 is shown how several selected portions of the grid 23 may be cut away to provide openings as shown at 47 above empty holes 22 in the supporting sheet 21 of the B board, with the result that current will be available in the grid over the route shown by the arrows (see also FIG. 10 at level IV). FIG. 9 also shows how two selected overlying posts 43 may be welded in selected positions on the grid (see level II of FIG. 10). At 51 on FIG. 9 are illustrated two selected weldments between the overlying strip portions of the grid 23 and underlying posts or pins such as 43 for carrying current down between boards (see level III on FIG. 10). At 53 on FIG. 9 are shown several uncut strip portions of the grid 23 over empty holes. Not all of the various uncut portions are lettered on FIG. 9 (see level I of FIG. 10). It will be understood that the particular locations at which the various operations above described and shown in FIGS. 9 and 10 are to be done is subject to change, depending upon whatever circuit configuration is sought in a stack of boards A, A', B, to be joined in assembly.

Figure 12:
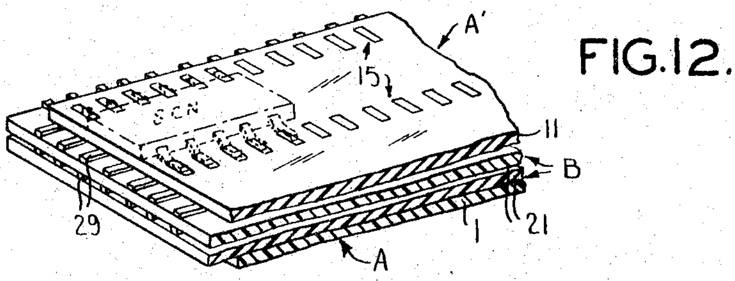
FIG. 12 is a fragmentary trimetric view of one corner of a typical welded assembly showing an attached semiconductor network.

After operations on B boards have been performed, as illustrated in FIGS. 9 and 10, assembly of A, A' and B boards is accomplished as follows (see FIGS. 11 and 12): First, an A board is laid down and small conductive pins such as 31 are welded to such of the stems 6 as may be desired to form part of the circuit which is to be set up. One of the pins 31, for example, may have another pin 35 welded to it. Then a B board is applied, appropriate ones of its openings 22 receiving pins 31 and 35. The lengths of the pins 31 and 35 are such that they may touch overlying grids 23 of subsequently applied B boards for some form of welding or other process of attachment. Weldments are shown by black lenticular shapes. It will be noted that the upper end of one of the pins 31 has had welded thereto the additional pin 35 for reception in an opening 22 of the second B board to be added. The pair of welded pins 31, 35 extend through a cut 47 in the grid of the first B board. Pins such as shown at 43 may also be welded to the grid 23 of the first B board at locations which register with the openings 22 in the second added B board. Such an added B board is shown in FIG. 10 at levels II and III. Appropriate openings in this added board will receive pins such as 35 and 43 for weldment to the grid 23 on the second B board. Additional posts or pins such as shown at 39 may be applied to the grid 23 of the second B board. If no further B boards are to be employed, the A' board may then be applied and some of its openings 14 will receive pins such as 39, or such others as may extend up from or through the second B board. These pins 39 are sufficiently long for engagement through the openings 14 with the conductive inserts 15. It will be understood that as each board is applied to another, a suitable adhesive such as an epoxy resin may be inserted therebetween to hold them together. As shown in FIG. 12, one or more semiconductor networks SCN may be attached to the outer conductive inserts 15 of the uppermost A' board. Such networks can also be applied to the exposed conductive inserts 5 of the A board. The numbers of these and the locations of the same are subject to variation, depending upon the circuitry desired. While two B boards have been described as sandwiched between outer A and A' boards, it will be understood that any appropriate number of B boards may be used by following the above-described procedures.

One of the features of the invention is that the grids 23 themselves, as well as the B boards with grids attached, may be manufactured in quantities so that they may be carried in stock. They also lend themselves to automation in their manufacture and also to automation in performance of various operations suggested at levels I, II, III and IV of FIG. 10. Thus appropriate automatic pin applicator and/or pin welder and/or strip cutter apparatus may be caused to move along the crossbars 25 and 27 of grid 23 to perform one or another of the four operations on boards as indicated in FIG. 10. This may be done on succeeding boards as one is laid upon the other. Such automatic apparatus is not shown, since it is not part of this invention, as claimed below. It is to be understood that the various assembly operations described may be performed manually. Inspection is convenient as an assembly is built up layer by layer.

In the above, current is carried between grids and contacts by inserted pins. Another manner in which cross connections may be made between boards is illustrated in FIG. 13, which eliminates the use of pins or posts in the holes 22. In FIG. 13, an A board and two B boards are shown. At numeral 55 is shown a combination punch and welder. This comprises a central blunt-nosed electrode 57, an outer electrode sleeve 61 and interposed insulation 59. Electrode 61 is beveled at the bottom as shown at 63. By driving device 55 downwardly as shown by the arrow at the left of FIG. 13, the part of the grid 23 which overlies a hole 22 may be driven down into contact with the part of the next underlying grid 23 over another lower hole 22. Then by exciting the electrodes, a weldment may be made as shown at 65.

At the right of FIG. 13 is shown how a similar deformation may be made in the lower one of the grids 23 into another lower hole 22 for making a weldment 71. Then in order that the deformation in the upper grid 23 may make electrical contact with the deformation in the lower grid, an infilling of a conductive metal may be added as shown at 67, and with which connection is made at weldment 69. Electric arc welding with a filler rod may be used for the purpose.

Advantages of the invention are as follows:

1. Grids such as 23 may conveniently be punched from flat sheets and stocked for application to underlying prepared substrate sheets 21.
2. Attachments may be made between grids and substrate sheets 21 to form the B boards.
3. B boards may be carried in stock in large numbers.
4. A boards and A' boards may each be carried in stock in large numbers.
5. Only simple operations are required manually or automatically to cut or electrically burn away the cross members 25 and 27 of the grid 23 over underlying openings; to place pins into holes or to punch strips into holes so as to make up an assembly.
6. Inspection of each plane of an assembly is convenient as the assembly is built up.
7. Only three types of boards such as A, A' and B need be stocked to form a very large variety of circuits in an assembly.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A modular circuit board comprising a sheet of insulating material having an array of holes therethrough, said array of holes being arranged in staggered rows and columns wherein the spacings of the holes in the respective rows and columns are substantially equal to form substantially square arrangements of the holes, a conductive grid attached to said sheet, said grid having been preformed with substantially square openings therethrough to provide strips having substantially right-angular intersections for covering said rows and columns of holes with the holes occupying positions between intersections under the strips at the sides of the square openings respectively.

2. A modular circuit board according to claim 1, including adhesive between the grid and the sheet whereby they are attached.

3. A modular circuit board comprising an insulating sheet having an array of openings therethrough arranged in evenly staggered rows and perpendicular columns, the spacings of the openings in said rows and columns being substantially equal, a conductive grid preformed to provide substantially evenly spaced perpendicular disposed strips of material overlying said rows and columns of openings, said openings occurring between the intersection of said perpendicular disposed strips, and an adhesive connecting the grid and the sheet.

4. A modular circuit board according to claim 3, wherein the openings provided by preforming are of square form and wherein said strips are of ribbon-like form.

5. A modular circuit board assembly comprising a plurality of substantially identical sandwiched circuit boards contained between outer circuit boards, the latter being similar and each comprising an insulating outer sheet, rows of openings through said sheets containing conductive material to present contact means on the outsides thereof, one of said outer circuit boards having recesses provided by portions of said openings therein for the reception of conductive means, each of said sandwiched circuit boards comprising an insulating sheet having an array of holes therethrough, said holes being arranged in staggered rows and staggered columns, each row of holes in the sandwiched boards registering with a row of the same in another, the rows of openings in the outer circuit boards registering with at least some of the rows of holes in the sandwiched boards, each sandwiched board supporting on one face a conductive grid at least in part covering the rows of holes therein, said holes occupying positions between the intersections of said grids, at least one of said grids having a portion removed from its covering position over at least one hole, and conductive means connecting at least two of the grids through at least one of the holes from which a grid portion has been removed.

6. A modular circuit board assembly comprising a plurality of substantially identical inner modular boards, each of said inner boards comprising a sheet of insulating material having an array of holes therethrough registering with holes of an adjacent board, said arrays of holes in each board being arranged in staggered rows and columns wherein the spacings of the holes in the respective rows and columns are substantially equal and forming substantially square arrangements of holes, each inner board including a conductive grid connected to one side of its insulating sheet, said grid having square openings therethrough providing substantially right-angularly intersecting strips covering at least some of said holes, said holes occupying positions between said intersecting strips, some of said strips being separated at some of said holes, a pair of outer boards similar to one another and each of which comprises an insulating outer sheet, rows of perforations through said outer sheets registering with at least some of the rows of holes in an inner board, the perforations in both outer boards containing exteriorly exposed contact material, the rows of perforations in one of the outer boards forming inner recesses for reception of conductive members extending from an adjacent inner board.

7. An assembly according to claim 6, wherein the exposed contacts on the outer boards are spaced for attachment of the terminals of at least one semiconductor network.

8. A modular circuit board assembly comprising:

(a) a plurality of substantially identical sandwiched circuit boards contained between outer circuit boards, the latter being similar and each comprising an insulating outer sheet, rows of openings through each of said sheets containing conductive material to present contact means on the outsides thereof, one of said outer circuit boards having recesses provided by portions of said openings therein for the reception of conductive means, (b) each of said sandwiched circuit boards comprising a sheet of insulating material having an array of holes therethrough, said array of holes being arranged in staggered rows and columns wherein the spacings of the holes in the respective rows and columns are substantially equal to provide substantially square arrangements of the holes, a conductive grid attached to said sheet, said grid being perforated with substantially square openings therethrough providing substantially right-angularly intersecting strips covering said rows and columns of holes with the holes occupying substantially midpositions under the strips at the sides of the square openings, respectively, and (c) each row of holes in the sandwiched boards registering with a row of the same in another sandwiched board, the rows of the openings in the outer circuit boards registering with at least some of the rows of the holes in the sandwiched boards, at least one sandwiched board having at least one of said grids with a portion thereof removed from its covering position over at least one hole, and conductive means connecting at least two of the grids through at least one of the holes from which the grid portion has been removed.

References Cited

UNITED STATES PATENTS

| | | | |
|---|---|---|---|
| 2,985,709 | 5/1961 | Mammola | 174—68.5 |
| 2,889,532 | 6/1959 | Slack. | |
| 3,038,105 | 6/1962 | Brownfield | 174—68.5 X |
| 3,052,823 | 9/1962 | Anderson et al. | 174—68.5 X |
| 3,072,734 | 1/1963 | Fox et al. | 174—68.5 |
| 3,077,511 | 2/1963 | Bohrer et al. | 174—68.5 X |
| 3,098,951 | 7/1963 | Ayer et al. | 174—68.5 X |
| 3,172,362 | 3/1965 | Noye et al. | 339—18 X |

DARRELL L. CLAY, *Primary Examiner.*